US005706716A

United States Patent [19]

Umemura

[11] Patent Number: 5,706,716

[45] Date of Patent: Jan. 13, 1998

[54] VARIABLE DISPLACEMENT SWASH PLATE TYPE COMPRESSOR

[75] Inventor: Yukio Umemura, Sano, Japan

[73] Assignee: Calsonic Corporation, Tokyo, Japan

[21] Appl. No.: 631,078

[22] Filed: Apr. 12, 1996

[30] Foreign Application Priority Data

| | | | |
|---|---|---|---|
| Apr. 13, 1995 | [JP] | Japan | 7-088362 |
| Apr. 13, 1995 | [JP] | Japan | 7-088363 |
| May 2, 1995 | [JP] | Japan | 7-108719 |
| Dec. 26, 1995 | [JP] | Japan | 7-339231 |

[51] Int. Cl.[6] ........ F16J 15/18

[52] U.S. Cl. ........ 92/165 PR; 92/71; 417/269; 74/60

[58] Field of Search ........ 92/12.2, 71, 165 R, 92/165 PR; 91/499; 417/269; 74/60

[56] References Cited

U.S. PATENT DOCUMENTS

| | | | |
|---|---|---|---|
| 1,714,145 | 5/1929 | Sperry | 74/60 |
| 3,938,397 | 2/1976 | Rasmussen | 74/60 |
| 3,939,717 | 2/1976 | Teisen | 74/60 |
| 4,364,306 | 12/1982 | Hattori et al. | 92/71 |
| 4,470,761 | 9/1984 | Mukai et al. | 92/71 |
| 4,664,604 | 5/1987 | Terauchi . | |
| 5,382,139 | 1/1995 | Kawaguchi et al. | 91/499 |
| 5,490,767 | 2/1996 | Kanou et al. | 417/269 |

FOREIGN PATENT DOCUMENTS

| | | | |
|---|---|---|---|
| 0 587 023 | 3/1994 | European Pat. Off. . | |
| 43 27 948 | 3/1994 | Germany . | |
| 1-227876 | 12/1989 | Japan | 92/71 |
| 1-227877 | 12/1989 | Japan | 92/71 |
| 6-346844 | 12/1994 | Japan . | |
| 8-109874 | 4/1996 | Japan | 417/269 |

*Primary Examiner*—Thomas E. Denion
*Attorney, Agent, or Firm*—Foley & Lardner

[57] ABSTRACT

In a variable displacement swash plate type compressor, there is employed a structure for stopping or minimizing a turning movement of a piston about its axis. The structure comprises a given part of the piston which is always out of the corresponding cylinder chamber; a turn stopper portion formed on the given part and including laterally opposed sides each having a rounded outer surface; and a cylindrical surface defined in a casing of the compressor at a portion which faces the turn stopper portion. The cylindrical surface is so arranged as to make a surface-to-surface contact with one of the laterally opposed sides when the piston is turned about its axis by a given angle.

20 Claims, 10 Drawing Sheets

VARIABLE DISPLACEMENT SWASH PLATE TYPE COMPRESSOR

BACKGROUND OF THE INVENTION

1. Field of the Invention

The present invention relates to variable displacement swash plate type compressors for use in an automotive air conditioning system or the like, and more particularly to such compressors of an improved type which has a mechanism for suppressing undesired play of pistons installed therein.

2. Description of the Prior Art

In automotive air conditioners, a so-called "variable displacement swash plate type compressor" is widely used, which can adjust the amount of compressed refrigerant discharged therefrom.

In the variable displacement swash plate type compressors, there is a type which generally comprises a drive shaft driven by a power plant such as an automotive engine, and a swash plate mounted on the drive shaft in a manner to be inclinable to the same. When the drive shaft is rotated, the swash plate carries out so-called "spiral turns" about the axis of the drive shaft. The compressor further comprises a plurality of cylinder chambers and a plurality of pistons slidably received in the cylinder chambers. Each piston is directly, but slidably engaged with the swash plate.

In the compressor of the above-mentioned type, each piston employed therein comprises a piston head portion which moves in the corresponding cylinder chamber, and a generally U-shaped base portion which is slidably engaged with the swash plate. For achieving the slidable engagement between the U-shaped base portion and the swash plate, two semi-spherical bearing shoes are used which are installed in a recess of the U-shaped base portion having a peripheral portion of the swash plate slidably put therebetween. Opposed walls defined in the recess of the U-shaped base portion have spherical recesses with which spherical outer surfaces of the two bearing shoes are slidably engaged, and upper and lower flat walls of the peripheral portion of the swash plate are slidably engaged with respective inner flat surfaces of the two semi-spherical bearing shoes. With this arrangement, the U-shaped base portion of each piston is slidably engaged with the swash plate.

Accordingly, when, due to rotation of the drive shaft, the swash plate is turned about the axis of the drive shaft making the spiral turns, the pistons are forced to make reciprocative movements relative to the cylinder chambers with different but subsequent cycles. That is, when, under rotation of the swash plate, the peripheral portion of the same comes to the nearest position to one cylinder chamber, the corresponding piston assumes its top dead point (TDP), while, when the peripheral portion comes to the farmost position to the cylinder chamber, the piston assumes its bottom dead position (BDP). That is, the spiral turns of the swash plate induce reciprocative movements of the pistons in the cylinder chambers.

With the reciprocative movements of the pistons, a refrigerant is introduced through an inlet port into the compressor and compressed by the pistons in the cylinder chambers and then discharged through an output port to the outside.

As is described hereinabove, under the spiral rotation of the swash plate, the pistons are forced to make reciprocative movement in the cylinder chambers.

In order to clarify the task of the present invention, the behavior of each piston under operation of the compressor will be described with reference to FIG. 16 which shows a view taken from an axially rear position of one piston 123.

Under operation of the compressor, a certain force is applied from the swash plate to the piston 7172 through the bearing shoes 123 inducing the reciprocative movement of the piston 123 in the corresponding cylinder chamber. That is, the piston 123 shown moves in a direction perpendicular to the surface on which the drawing of FIG. 16 is illustrated.

As is seen from the drawing, under operation of the compressor, a peripheral portion of the swash plate slidably passes at a high speed between the two bearing shoes 71 and 72 in the direction of the arrow "A", and thus, there is generated a force for urging the piston 123 to turn about is axis in the direction of the arrow "B". Of course, for obtaining a satisfied work of the compressor, it is necessary to stop or suppress such turning movement of the piston 123.

One conventional measure for the suppression is shown in the same drawing. That is, in the measure, the piston 123 has on its outer surface an axially extending ridge 124, and the casing 112 has at its inner wall an axially extending groove 127 which slidably receives the ridge 124 of the piston 123. With this arrangement, the undesired turning movement of the piston 123 is suppressed.

However, in order to form the ridge 124 on the piston 123 and the groove 127 in the casing 112, there is a need of using skill-required and time-consuming machining process, which causes costly construction of the compressor. Furthermore, due to a clearance that is inevitably left between the ridge 124 and the inner wall of the groove 127, a slight but assured pivoting of the piston 123 about its axis is permitted. However, this permitted pivoting causes a collision of the ridge 124 against the inner wall of the groove 127, which tends to produce a marked noise.

In order to eliminate the above-mentioned drawbacks, another measure has been proposed by Japanese Patent First Provisional Publication 6-346844, which is depicted by FIG. 17 of the drawings.

That is, as is seen from the drawing, for suppressing the undesired turning movement of the piston 133, there is provided on a rear base part of the piston 133 a convex surface 134 which faces a cylindrical inner surface of the casing 112 with a slight clearance left therebetween. The radius of curvature "$R_1$" of the convex surface 134 is larger than that "$R_p$" of the cylindrical outer surface of a major part of the piston 133, but smaller than that "$R_2$" of the cylindrical inner surface of the casing 112. This dimensional relationship seems to be provided for achieving a so-called "surface-to-surface contact" between the convex surface 134 and the cylindrical inner surface of the casing 112 upon the turning movement of the piston 133.

However, in fact, as is shown by a phantom line, when the piston 133 is turned by a certain angle about its axis, only one edge 135*a* of the convex surface 134 abuts against the cylindrical inner surface of the casing 112. Of course, in this case, the edge 135*a* is subjected to wearing and thus the turning suppression effect becomes poor in a short time.

As is seen from FIGS. 18 to 20, the undesired wearing is promoted when the piston 133 is subjected to a so-called "pitching motion" during its reciprocative movement in the cylinder chamber. In fact, due to the complicated slidable engagement through which the swash plate and the pistons 133 are slidably coupled, operation of the swash plate applies each piston 133 with various types of moments "Ma" and "Mb", which causes the pitching of the piston 133.

As will be understood from FIG. 17, under operation of the compressor, a lubricant oil in a crank chamber is splashed by the rotating swash plate toward the convex portion 134, that is, in the direction of the arrow "C". However, if the edge 135*a* of the convex portion 134 is kept in abutment with the inner surface of the casing 112 as is described hereinabove, the splashed lubricant oil is prevented from entering the clearance between the convex surface 134 and the cylindrical inner surface of the case 112, which induces a poor lubrication of frictionally engaged portions of them.

SUMMARY OF THE INVENTION

It is therefore an object of the present invention to provide a variable displacement swash plate type compressor which is free of the above-mentioned drawbacks.

According to a first aspect of the present invention, there is provided a variable displacement swash plate type compressor which comprises a casing having a plurality of cylinder chambers circumferentially arranged therein; a plurality of pistons incorporated with the cylinder chambers respectively; a drive shaft extending in the casing; a swash plate disposed on the drive shaft and inclinable relative to the same; means for causing the swash plate to make spiral turns when the drive shaft is rotated; means for achieving a hinged connection between the swash plate and each of the pistons to make a reciprocative movement of each piston when the drive shaft is rotated; and a structure for minimizing a turning movement of each piston about its axis. The structure includes a given part of the piston which is always out of the corresponding cylinder chamber; a turn stopper portion formed on the given part, the turn stopper portion including laterally opposed sides each having a rounded outer surface; and means defining a cylindrical surface in the casing at a portion which faces the turn stopper portion, the cylindrical surface being so constructed and arranged as to make a surface-to-surface contact with one of the laterally opposed sides when the piston is turned about its axis by a given angle.

According to a second aspect of the present invention, there is provided a variable displacement swash plate type compressor which comprises a casing having a plurality of cylinder chambers circumferentially arranged therein; a plurality of pistons incorporated with the cylinder chambers respectively; a drive shaft extending in the casing; a swash plate disposed on the drive shaft and inclinable relative to the same; means for causing the swash plate to make spiral turns when the drive shaft is rotated; means for achieving a hinged connection between the swash plate and each of the pistons to make a reciprocative movement of each piston when the drive shaft is rotated; and a structure for minimizing a turning movement of each piston about its axis. The structure includes a given part of the piston which is always out of the corresponding cylinder chamber; a turn stopper portion formed on the given part, the turn stopper portion including a major part which has a rounded outer surface and laterally opposed sides each having a rounded outer surface; and means defining a cylindrical surface in the casing at a portion which faces the turn stopper portion, the cylindrical surface being so arranged as to make a surface-to-surface contact with one of the laterally opposed sides when the piston is turned about its axis by a given angle.

According to a third aspect of the present invention, there is provided a variable displacement swash plate type compressor which comprises a casing having a plurality of cylinder chambers circumferentially arranged therein; a plurality of pistons incorporated with the cylinder chambers respectively; a drive shaft extending in the casing; a swash plate disposed on the drive shaft and inclinable relative to the same; means for causing the swash plate to make spiral turns when the drive shaft is rotated; means for achieving a hinged connection between the swash plate and each of the pistons to make a reciprocative movement of each piston when the drive shaft is rotated; and a structure for minimizing a turning movement of each piston about its axis. The structure includes a given part of the piston which is always out of the corresponding cylinder chamber; a turn stopper portion formed on the given part, the turn stopper portion including a major part which has a rounded outer surface; a cylindrical surface defined by an inner wall of the casing at a position which faces the turn stopper portion, the cylindrical surface including two parallel bank portions which extend axially and have each a cylindrical top surface, and means which defines an axially extending groove between the two parallel bank portions, the cylindrical top surface of each bank portion being so arranged as to make a surface-to-surface contact with the rounded outer surface of the major part of the turn stopper portion when the piston is turned about its axis by a given angle.

According to a fourth aspect of the present invention, there is provided a variable displacement swash plate type compressor which comprises a casing having a plurality of cylinder chambers circumferentially arranged therein; a plurality of pistons incorporated with the cylinder chambers respectively; a drive shaft extending in the casing; a swash plate disposed on the drive shaft and inclinable relative to the same; means for causing the swash plate to make spiral turns when the drive shaft is rotated; means for achieving a hinged connection between the swash plate and each of the pistons to make a reciprocative movement of each piston when the drive shaft is rotated; and a structure for minimizing a turning movement of each piston about its axis. The structure includes a given part of the piston which is always out of the corresponding cylinder chamber; a turn stopper portion formed on the given part, the turn stopper portion including a major part which has a rounded outer surface, laterally opposed rounded sides and axially opposed rounded sides; means defining a cylindrical surface in the casing at a portion which faces the turn stopper portion, the cylindrical surface being so arranged as to make a surface-to-surface contact with one of the laterally opposed rounded sides when the piston is turned about its axis by a given angle and so arranged as to make a surface-to-surface contact with one of the axially opposed rounded sides when the piston is subjected to a pitching motion.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments of the present invention will be described in detail with reference to the accompanying drawings.

Figure 1:
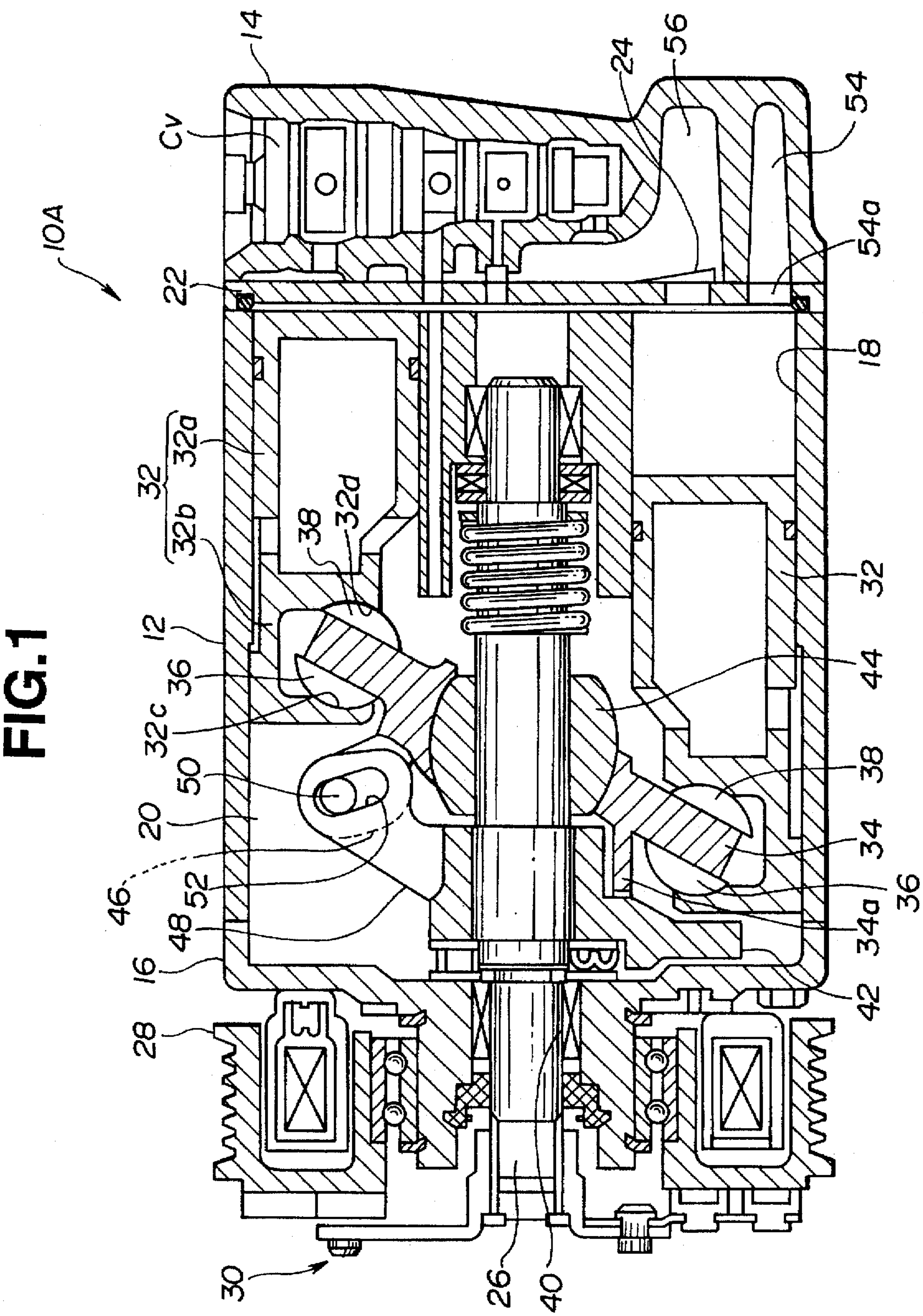
FIG. 1 is a sectional view of a variable displacement swash plate type compressor, according to a first embodiment of the present invention.

Referring to FIGS. 1 to 4, particularly FIG. 1, there is shown a variable displacement swash plate type compressor of a first embodiment of the present invention, which is generally denoted by numeral 10A.

The compressor 10A comprises a cylindrical casing 12 and first and second heads 14 and 16 secured to axially opposed open ends of the casing 12. These three members are united tightly by means of bolts (not shown). Within the casing 12, there are defined a plurality of cylinder chambers 18 and a crank chamber 20.

The first head 14 is connected to the casing 12 through a valve sheet 22. The valve sheet 22 is provided with intake valves (not shown) and discharge valves (not shown). These intake and discharge valves are circumferentially arranged at evenly spaced intervals on the valve sheet 22. Designated by numeral 24 is a valve body possessed by one of the discharge valves.

A drive shaft 26 extends axially in the casing 12. The drive shaft 26 has an extension which pierces the second head 16 to be exposed to the outside. A bearing 40 is held in the second head 16 to bear the drive shaft 26.

A pulley 28 is disposed on the exposed part of the drive shaft 26 through an electromagnetic clutch 30. Although not shown in the drawing, a transmission belt driven by an engine is put on the pulley 28. Thus, when, under operation of the engine, the clutch 30 is turned ON to be engaged, the power of the engine is transmitted to the drive shaft 26 to rotate the same. While, when the clutch 30 is turned OFF to be disengaged, the power of the engine rotates only the pulley 28.

The cylinder chambers 18 are circumferentially arranged in the casing 12 at evenly spaced intervals. The cylinder chambers 18 are the same in construction and have respective pistons 32 slidably disposed therein. The pistons 32 are the same in construction.

Each piston 32 comprises a piston head portion 32*a* which is slidably disposed in the corresponding cylinder chamber 18 and a generally U-shaped base portion 32*b* which is always out of the cylinder chamber 18.

As shown, the U-shaped base portion 32*b* is engaged with a peripheral portion of a swash plate 34 through two semi-spherical bearing shoes 36 and 38. Opposed walls defined in a recess of the U-shaped base portion 32*b* of the piston 32 have spherical recesses 32*c* and 32*d* into which spherical outer portions of the two bearing shoes 36 and 38 are slidably received, and opposed flat walls of the two bearing shoes 36 and 38 slidably put therebetween the peripheral flat portion of the swash plate 34. The swash plate 34 is formed with a balancer 34*a*.

Within the crank chamber 20 near the bearing 40, a rotor member 42 is disposed on the drive shaft 26 to rotate therewith. A spherical slider member 44 is axially slidably disposed on the drive shaft 26. The slider member 44 is formed with a spherical outer surface as shown. The swash plate 34 is pivotally disposed on the spherical outer surface of the slider member 44. For this pivotal connection, the swash plate 34 is formed with a concave bore with which the spherical outer surface of the slider member 44 is slidably engaged. The swash plate 34 and the rotor member 42 are formed with respective links 46 and 48. A pin 50 extending from the link 46 of the swash plate 34 extends into an elongate slot 52 formed in the link 48 of the rotor member 42, so that the swash plate 34 and the rotor member 42 are hinged to each other. Thus, when, due to rotation of the drive shaft 26, the rotor member 42 is rotated, the swash plate 34 is also rotated about the axis of the drive shaft 26. With movement of the slider member 44 along the drive shaft 26, the swash plate 34 is subjected to inclination relative to the drive shaft 26 using the pin 50 as a fulcrum. That is, the inclination angle of the swash plate 34 relative to an imaginary plane perpendicular to the axis of the drive shaft 26 is adjustable. When, as is seen from FIG. 1, the balancer 34*a* of the swash plate 34 is in contact with the rotor member 42, the inclination angle takes its maximum value.

The first head 14 has a known control valve "Cv" installed therein. That is, due to work of the control valve "Cv", the pressure in the crank chamber 20 is controlled in accordance with the inlet pressure of a refrigerant returned to the compressor 10A and thus the inclination angle of the swash plate 34 is controlled. With this, the amount of refrigerant discharged from the compressor 10A can be adjusted, and the inlet pressure of the compressor 10A can be kept constant.

Inlet and outlet ports 54 and 56 are formed in the first head 14. The inlet port 54 receives a return refrigerant from an evaporator (not shown). The refrigerant is then introduced into the cylinder chambers 18 in order through an intake opening 54*a* and the intake valves (not shown) of the valve sheet 22 in response to the intake stroke of the corresponding pistons 32. After being compressed by the pistons 32, the refrigerant in the cylinder chambers 18 is led into the outlet port 56 in order through the discharge valves (not shown) of the valve sheet 22.

Figure 2:
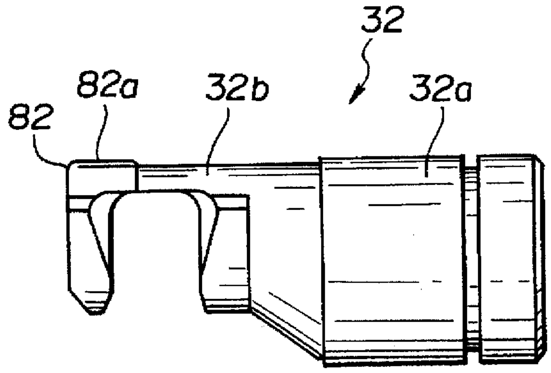
FIG. 2 is a side view of a piston employed in the first embodiment.
Figure 3:
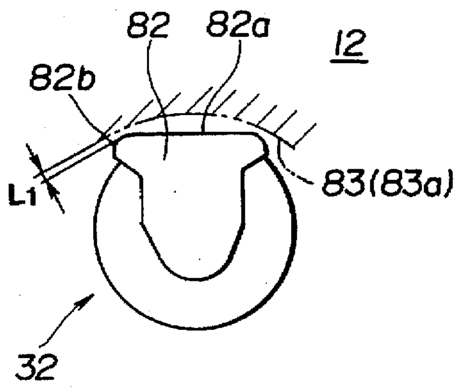
FIG. 3 is a rear view of the piston of the first embodiment.

In the following, a unique measure applied to the compressor 10A will be described with reference to FIGS. 2 and 3 which show one of the pistons 32.

As is seen from these drawings, the generally U-shaped base portion 32*b* of the piston 32 is formed at its axially rear end with a so-called turn stopper portion 82. As will become apparent as the description proceeds, the turn stopper portion 82 functions to suppress or at least minimize undesired turning movement of the piston 32 relative to the corresponding cylinder chamber 18.

The turn stopper portion 82 comprises a major part 82*a* with a slightly rounded outer surface which faces radially outward. Laterally opposed sides (or shoulder parts) 82*b* of the major part 82*a* are smoothly rounded. If desired, the major part 82*a* may have a flat outer surface in place of the slightly rounded outer surface. The rounded outer surface defined by each shoulder part 82*b* has a radius of curvature of "r" (see FIG. 4). Preferably, the value "r" is equal to or greater than 1 mm.

Figure 4:
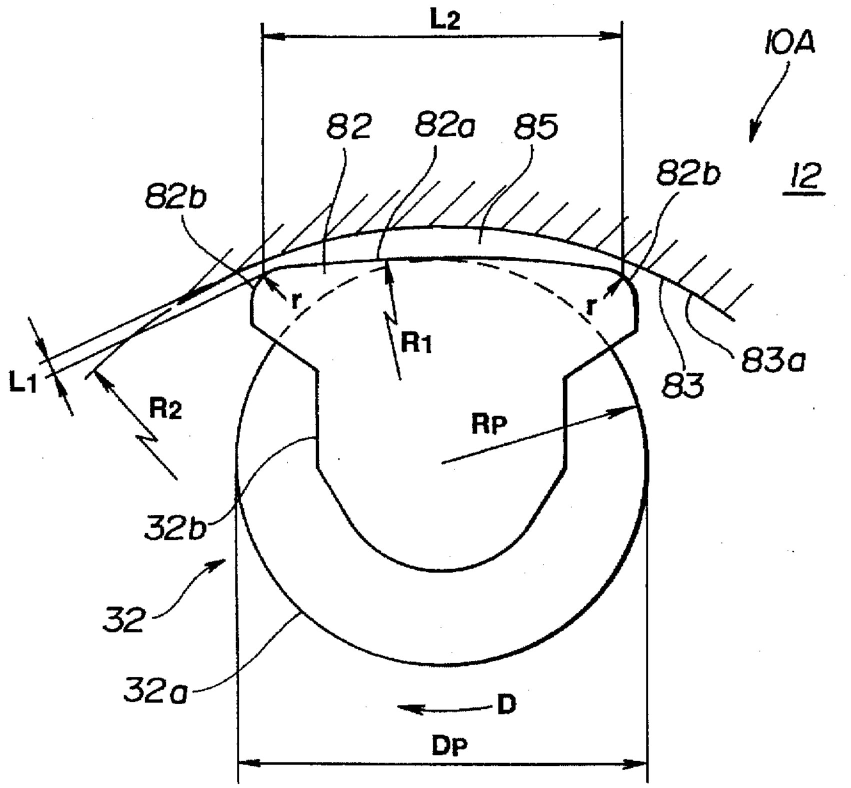
FIG. 4 is an enlarged view of FIG. 3, but showing the manner for suppressing a turning movement of the piston.
Figure 5:
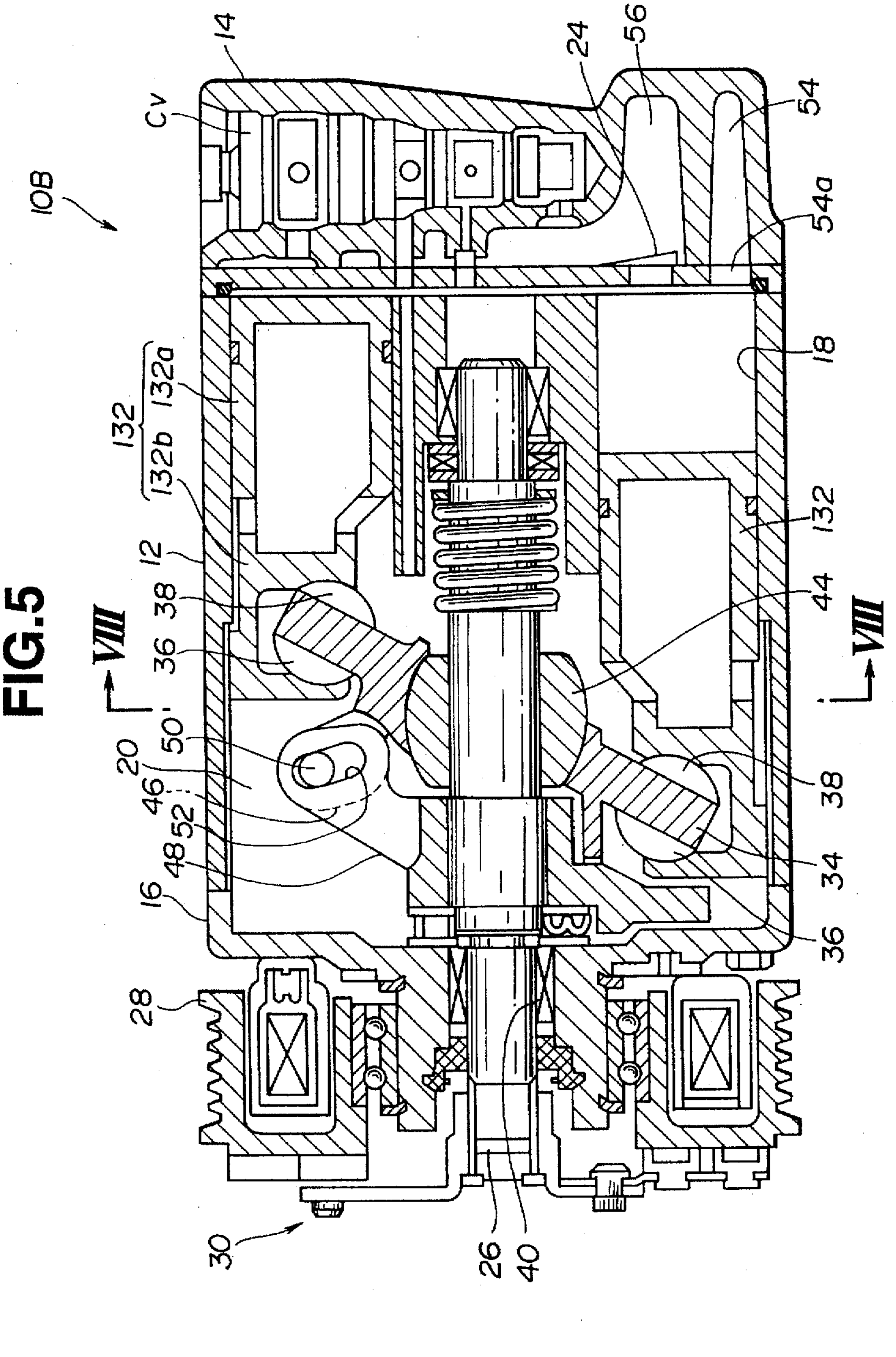
FIG. 5 is a sectional view of a variable displacement swash plate type compressor according to a second embodiment of the present invention.

As is seen from FIG. 4, an inner cylindrical surface of the casing 12 is formed, at a portion facing the turn stopper portion 82 of the piston 32, with a concave recess 83 having a cylindrical surface 83*a*. As is understood from the drawing, upon assembly of the piston 32, a small given clearance "$L_1$" is defined between each rounded shoulder part 82*b* of the turn stopper portion 82 of the piston 32 and the cylindrical surface 83*a* of the casing 12.

Accordingly, when, under operation of the compressor 10A, the piston 32 is turned about its axis in the direction of the arrow "D", the rounded left shoulder part 82*b* of the turn stopper portion 82 of the piston 32 stops or minimizes the turning of the piston 32 by abutting against the cylindrical surface 83*a* of the concave recess 83 of the casing 12. It is to be noted that due to the nature of the rounded surfaces respectively possessed by the rounded left shoulder part 82*b* and the cylindrical surface 83*a*, a so-called "surface-to-surface contact" is established therebetween upon such abutting. Furthermore, because, even under such abutting condition, the rounded left shoulder part 82*b* leaves a wedge-shaped oil catching pocket between it and the cylindrical surface 83*a*, the splashed lubricant oil in the crank chamber 20 is permitted to smoothly penetrate between the turn stopper portion 82 and the cylindrical surface 83*a* from the pocket.

In the following, the measure of the first embodiment 10A will be described in more detail with reference to FIG. 4.

In the drawing, designated by reference "$L_2$" is a distance between the left and right rounded shoulder parts 82*b* of the turn stopper portion 82. Specifically speaking, the distance "$L_2$" is the distance which is defined between a center point of one contact area which is produced between the left rounded shoulder part 32*b* and the cylindrical surface 83*a* when the piston 32 is turned in the direction of the arrow "D" and a center point of the other contact area which is produced when the piston 32 is turned in the other direction. Preferably, the distance "$L_2$" is equal to or greater than 0.9 times the diameter "Dp" of the piston head portion 32*a* of the piston 32, with this arrangement, undesired locking engagement between the turn stopper portion 82 and the cylindrical surface 83*a* is assuredly prevented irrespective of various possible frictional engagement therebetween in a practical use of the compressor 10A.

In FIG. 4, reference "$R_1$" designates a radius of curvature of the major part 82*a* of the turn stopper portion 82. The value "$R_1$" is greater than a radius "$R_p$" of curvature of the piston head portion 32*a* of the piston 32. Reference "$R_2$" designates a radius of curvature of the cylindrical surface 83*a* of the casing 12, which is greater than "$R_p$" but smaller than "$R_1$" The cylindrical surface 83*a* is a part of an imaginary cylinder whose center axis extends in parallel with the axis of the drive shaft 26. However, if desired, the cylindrical surface 83*a* may be a part of an imaginary cylinder whose center axis is common to the axis of the drive shaft 26. Thus, in this case, the cylindrical surfaces 83*a* for the turn stopper portions 82 of all the pistons 32 constitute a common cylinder surface whose center axis is common to the axis of the drive shaft 26.

With the above-mentioned dimensional features, there is defined a crescent space 85 between the major part 82*a* of the turn stopper portion 82 of the piston 32 and the cylindrical surface 83*a* of the casing 12, as shown. The crescent space 85 can serve as an oil sump into which the lubricant oil splashed by the swash plate 34 penetrates during operation of the compressor 10A. Due to provision of the oil sump 85, lubrication between the turn stopper portion 82 and the cylindrical surface 83*a* of the casing 12 is effectively carried out. In fact, the splashed lubricant oil can enter the crescent space 85 from the back of the turn stopper portion 82.

Of course, the axial length of the cylindrical surface 83*a* is so determined as not to interfere with the reciprocative movement of the piston 32.

In the following, operation of the compressor 10A will be described with reference to FIG. 1.

When, under operation of the engine, the electromagnetic clutch 30 is turned ON, the drive shaft 26 is rotated and thus the swash plate 34 is rotated together with the drive shaft 26. If the swash plate 34 is kept inclined relative to the drive shaft 26, the swash plate 34 makes a so-called "spiral turns" about the axis of the drive shaft 26 and thus, the pistons 32 make reciprocative movements relative to the cylinder chambers 18. With this, induction, compression and discharge of a refrigerant are carried out by the compressor 10A in the above-mentioned manner.

When a thermal load in a cooling cycle is relatively high, the pressure of the refrigerant from the evaporator is relatively high. In this case, due to work of the control valve "Cv", the crank chamber 20 is fed with a relatively high intake pressure. Thus, the pressure in the crank chamber 20 becomes substantially equal to the intake pressure. Under this condition, the piston 32 under intake stroke has substantially no pressure difference between its front and rear positions, so that the piston 32 can smoothly return to its rearmost position in the corresponding cylinder chamber 18 increasing the stroke thereof. If, under this condition, compression is carried out by the piston 32, the amount of refrigerant to be discharged is increased. Thus, increased amount of refrigerant is fed to the cooling cycle thereby to meet with the requirement of the high thermal load of the cooling cycle. With this, the intake pressure of the compressor is gradually lowered and finally, the intake pressure is kept constant.

When the thermal load in the cooling cycle is relatively low, the refrigerant from the evaporator fails to get a satisfied superheat and thus the pressure of the returning refrigerant is relatively low. In this case, due to work of the control valve "Cv", a highly compressed refrigerant compressed by the piston 32 and led to the outlet port 56 is introduced into the crank chamber 20 thereby to increase the pressure in the crank chamber 20. With this, there is produced a difference in the moment applied to the pistons 32 about the pin 50, so that the pressure balancing between the front and rear positions of each piston 32 becomes changed. Thus, the inclination angle of the swash plate 34 is reduced.

In the following, advantages of the above-mentioned first embodiment 10A will be described.

During the operation of the compressor 10A, the swash plate 34 makes the spiral turns while pushing and pulling the pistons 32 one after another. That is, under such operation, the peripheral portion of the swash plate 34 slidably passes at a high speed between the two bearing shoes 36 and 38, generating a force by which each piston 32 is subjected to undesired turning movement in one direction about the axis thereof. If, as is understood from FIG. 4, the turning movement of the piston 32 in the direction of the arrow "D" increases to a given degree namely "$L_1$", the rounded left shoulder part 82*b* of the turn stopper portion 82 of the piston 32 makes a so-called surface-to-surface contact with the cylindrical surface 83*a* of the casing 12. Thus, the undesired turning movement of the piston 32 is smoothly stopped without generating a marked noise.

Because, even under abutting of the turn stopper portion 82 of the piston 32 against the cylindrical surface 83*a* of the casing 12, the rounded left shoulder part 82*b* leaves a wedge-shaped oil catching pocket between it and the cylindrical surface 83*a*, the lubricant oil splashed by the swash plate 34 in the crank chamber 20 can penetrate easily between the turn stopper portion 82 and the cylindrical surface 83*a* from the pocket. In this case, the crescent space 85 defined between the turn stopper portion 82 and the cylindrical surface 83*a* serves as an oil sump.

As is known to those skilled in the art, forming the turn stopper portion 82 on the piston 32 and shaping the concave recess 83 in the casing 12 are easily made without using a skilled machining technique. Thus, the compressor 10A can be produced at low cost.

Because of simple and compact construction of the turn stopper portion 82, the piston 32 can have a light weight structure. Thus, a load applied to the piston 32 under operation of the compressor 10A is reduced.

If the cylindrical surfaces 83*a* of the casing 12 against which the turn stopper portions 82 of the pistons 32 slidably abut are constructed to constitute a common cylinder surface as has been described hereinabove, the casing 12 can be easily produced with a simple machining process.

Figure 6:
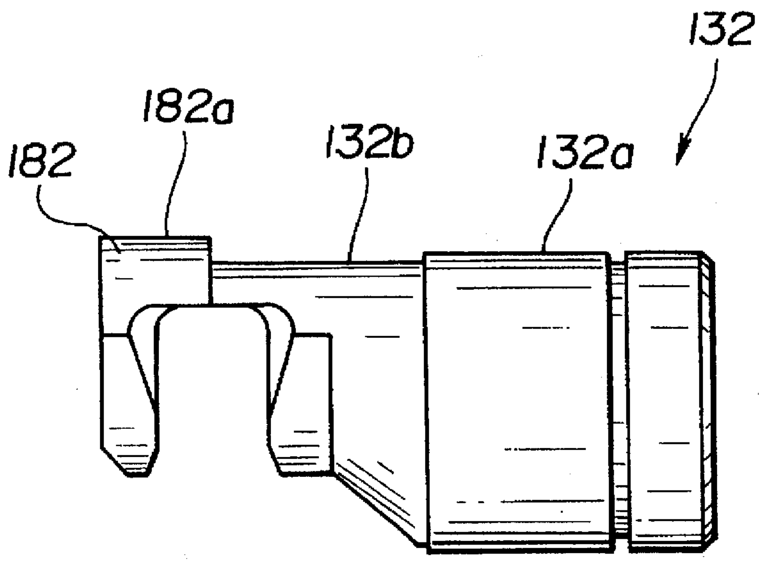
FIG. 6 is a side view of a piston employed in the second embodiment.
Figure 7:
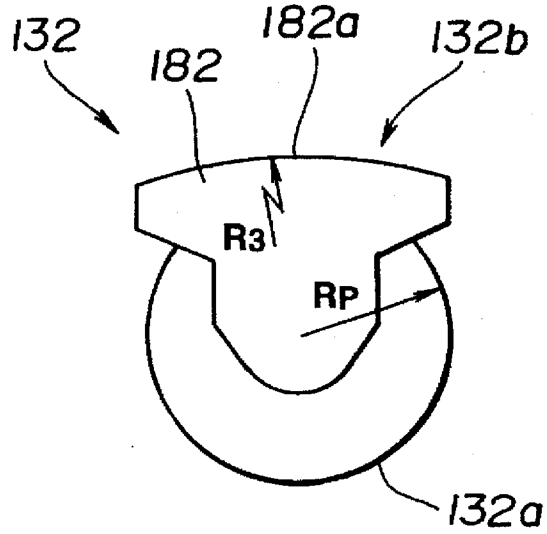
FIG. 7 is a rear view of the piston of the second embodiment.
Figure 8:
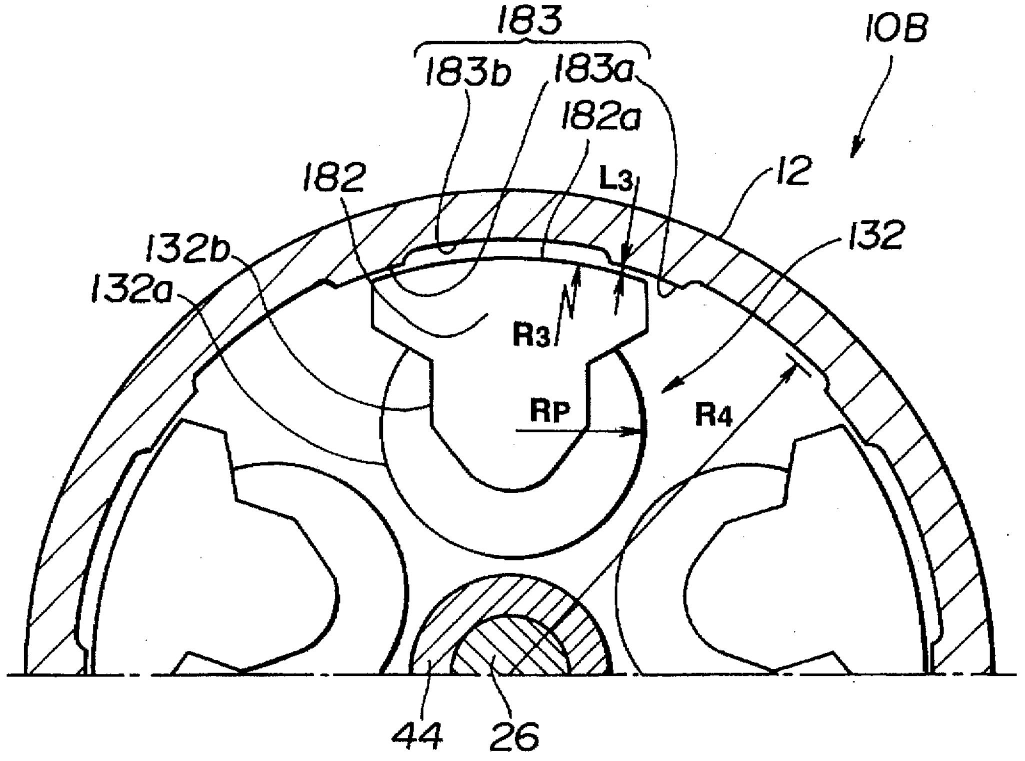
FIG. 8 is a sectional upper-half view taken along the line VIII—VIII of FIG. 5.

Referring to FIGS. 5 to 9, particularly FIG. 8, there is shown a variable displacement swash plate type compressor of a second embodiment of the present invention, which is generally designated by numeral 10B.

Since the second embodiment 10B is similar in construction to the above-mentioned first embodiment 10A, detailed description will be directed to only parts and constructions which are different from those of the first embodiment 10A.

As is seen from FIGS. 6, 7 and 8, each piston 132 comprises a piston head portion 132*a* which is slidably disposed in the corresponding cylinder chamber 18 and a generally U-shaped base portion 132*b* which is always out of the cylinder chamber 18. The U-shaped base portion 132*b* is operatively engaged with a peripheral portion of a swash plate 34 in the same manner as in the case of the above-mentioned first embodiment 10A.

As is seen from FIGS. 6, 7 and 8, the generally U-shaped base portion 132*b* of the piston 132 is formed at its axially rear end with a turn stopper portion 182.

The turn stopper portion 182 is formed with a rounded outer surface 182*a* which faces radially outwardly. The radius "$R_3$" of curvature of the rounded outer surface 182*a* is greater than a radius "$R_p$" of curvature of the piston head portion 132*a* of the piston 132.

Figure 9:
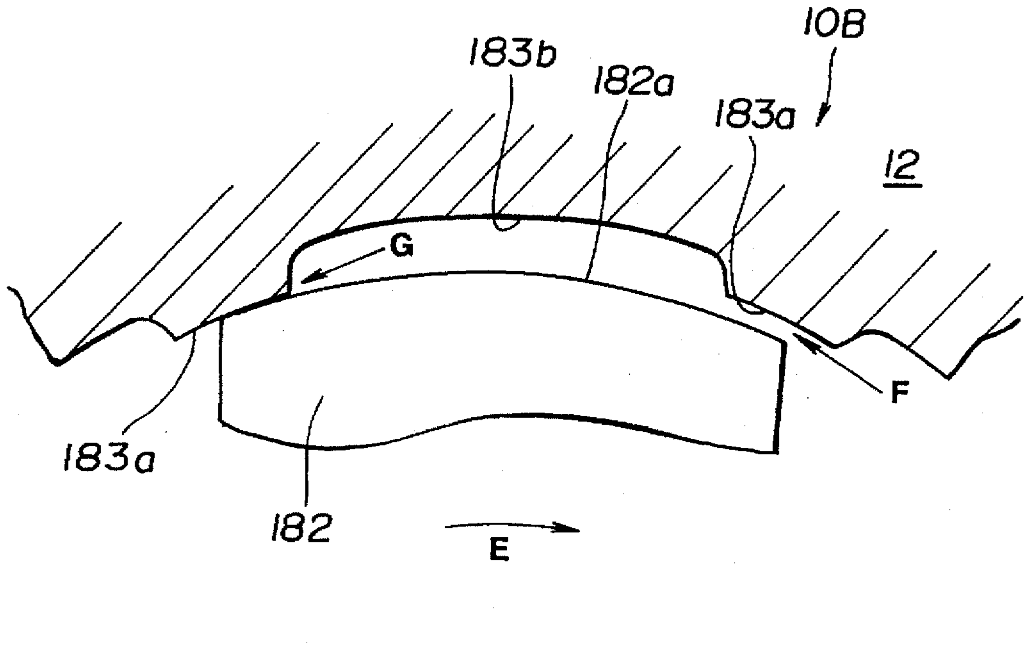
FIG. 9 is an enlarged view of a part of FIG. 8, but showing the manner for suppressing a turning movement of the piston.

As is seen from FIGS. 8 and 9, an inner cylindrical surface of the casing 12 is formed, at a portion facing the turn stopper portion 182 of the piston 132, with a grooved surface 183. The grooved surface 183 comprises two axially extending bank portions 183*a* and an axially extending groove 183*b* defined between the two bank portions 183*a*.

The bank portions 183*a* have each a cylindrical top surface which is concentric with the axis of the drive shaft 26. That is, the cylindrical top surfaces of all of the bank portions 183*a* constitute a part of an imaginary cylinder whose axis is common to the axis of the drive shaft 26. Designated by reference "$R_4$" in FIG. 8 is the radius of the imaginary cylinder. However, if desired, the cylindrical top surface of the paired bank portions 183*a* may be constructed to be eccentric from the axis of the drive shaft 26. As is seen from this drawing, upon assembly of the piston 132, a small given clearance "$L_3$" is defined between the top of each bank portion 183*a* and the rounded outer surface 182*a* of the turn stopper portion 182.

Accordingly, when, under operation of the compressor 10B, the piston 132 is turned about its axis in the direction of the arrow "E" (see FIG. 9), the rounded left part of the turn stopper portion 182 stops or minimizes the turning of the piston 132 by abutting against the left bank portion 183*a*.

In the following, advantages of the second embodiment 10B will be described.

Due to the nature of the rounded surfaces respectively possessed by the rounded left part of the turn stopper portion 182 and the top of the left bank portion 183*a*, a so-called "surface-to-surface contact" is established therebetween when the piston 132 is subjected to a marked turning movement about its axis. Thus, the undesired turning movement of the piston 132 is smoothly stopped without generating a marked noise.

Under operation of the compressor 10B, the groove 183*b* formed in the casing 12 can serve as an oil sump in which the lubricant oil is collected.

When, as is seen from FIG. 9, one rounded end part of the turn stopper portion 182 is in abutment with the bank portion 183*a* of the casing 12, the other rounded end part of the turn stopper portion 182 is kept separated from the corresponding bank portion 183*a* as is indicated by an arrow "F". Thus, the splashed lubricant oil in the crank chamber 20 can smoothly enter the oil sump.

As is seen from FIG. 9, even when the turn stopper portion 182 is in abutment with the bank portion 183*a*, the rounded outer surface of the stopper portion 182 leaves a wedge-shaped oil catching pocket between it and the rounded top surface of the bank portion 183*a* as is indicated by an arrow "G". Thus, the lubricant oil in the oil sump can smoothly penetrate between the contacting surfaces of them.

Referring to FIGS. 10, 11, 12, 13 and 14, there is shown a variable displacement swash plate type compressor of a third embodiment of the present invention, which is generally designated by numeral 10C.

Figure 10:
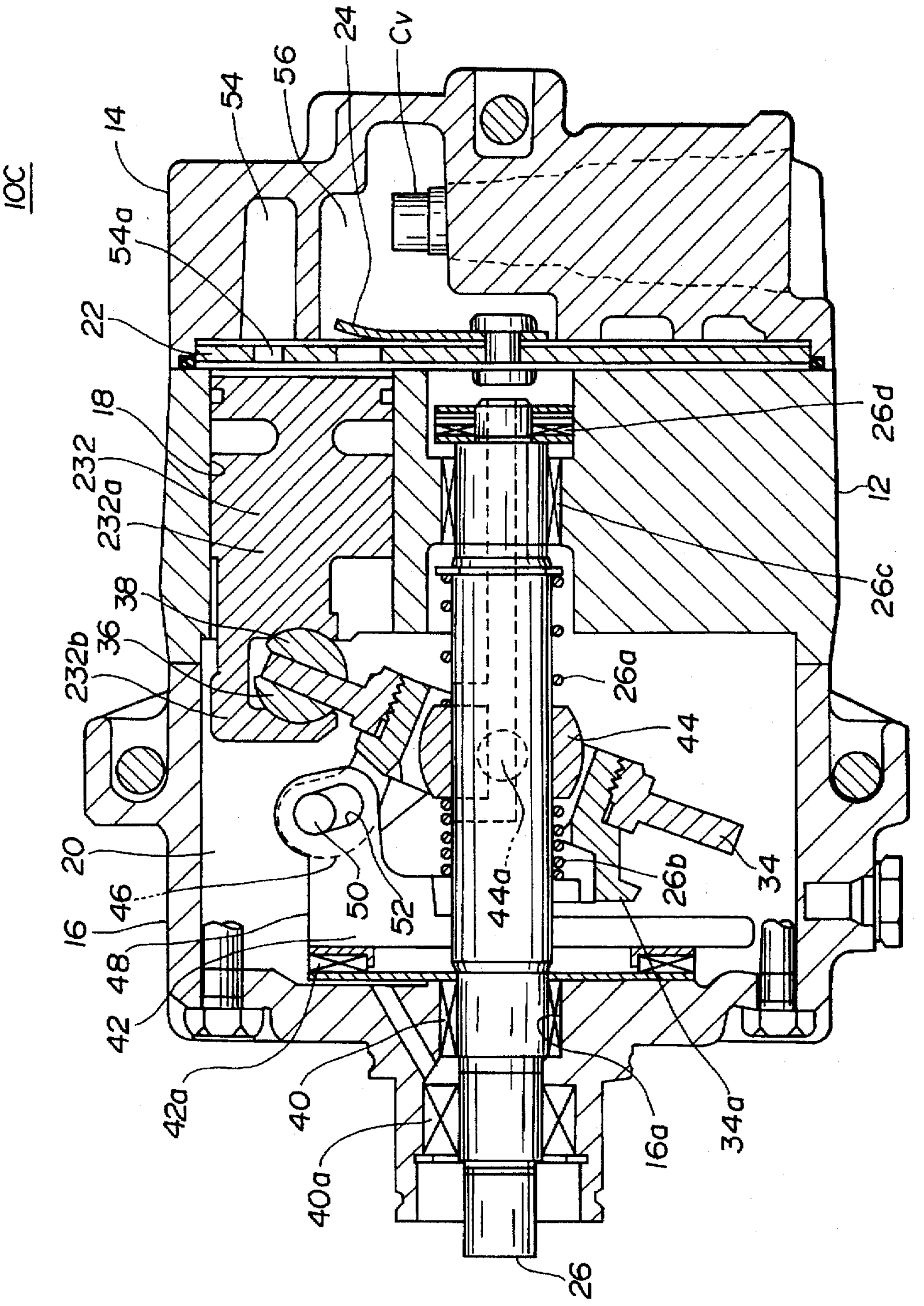
FIG. 10 is a sectional view of a variable displacement swash plate type compressor according to a third embodiment of the present invention.

As is understood from FIG. 10, the compressor 10C comprises a cylinder block 12 and first and second heads 14 and 16 which are secured to axially opposed ends of the cylinder block 12. These three parts 12, 14 and 16 are constructed of an aluminum alloy. These three members are united tight by means of bolts (no numerals). The cylinder block 12 has a plurality of cylinder chambers 18 defined therein. The second head 16 has a crank chamber 20 defined therein.

The first head 14 is connected to the cylinder block 12 through a valve sheet 22. The valve sheet 22 is provided with intake and discharge valves (not shown). These valves are circumferentially arranged at evenly spaced intervals on the valve sheet 22. Designated by numeral 24 is a valve body possessed by one of the discharge valves.

A drive shaft 26 extends axially in the cylinder block 12 and the second head 16. The second head 16 has a bore 16*a* through which the drive shaft 26 extends to the outside. A radial bearing 40 is disposed in the bore 16*a* to bear the drive shaft 26, and an oil seal 40*a* is arranged near the bearing 40 for hermetically isolating the crank chamber 20. Although not shown in the drawing, a pulley is connected to the drive shaft 26 through an electromagnetic clutch. A transmission belt (not shown) driven by an engine is put around the pulley.

The cylinder chambers 18 are circumferentially formed in the cylinder block 12 at evenly spaced intervals. The cylinder chambers 18 are the same in construction and have respective pistons 232 slidably disposed therein. The pistons 232 are the same in construction.

Each piston 232 is constructed of an aluminum alloy and comprises a piston head portion 232*a* which is slidably disposed in the corresponding cylinder chamber 18 and a generally U-shaped base portion 232*b* which is always out of the cylinder chamber 18. Preferably, the piston head portion 232*a* is coated with a fluororesin film or the like to achieve a smoother movement thereof in the cylinder chamber 18.

As shown, the U-shaped base portion 232*b* is engaged with a peripheral portion of a swash plate 34 through two semi-spherical bearing shoes 36 and 38. Opposed walls defined in a recess of the U-shaped base portion 232*b* of the piston 232 have spherical recesses (no numerals) into which spherical outer portions of the two bearing shoes 36 and 38 are slidably received, and opposed flat walls of the two bearing shoes 36 and 38 slidably put therebetween the peripheral flat portion of the swash plate 34. The swash plate 34 employed in this embodiment 10C essentially consists of a journal portion and an annular portion which are coupled through a screw connection. The journal portion is constructed of a cast iron, while, the annular portion is constructed of a steel. The swash plate 34 has a balancer 34*a*.

Within the crank chamber 20, a rotor member 42 is disposed on the drive shaft 26 to rotate therewith. Operatively disposed between the rotor member 42 and the second head 16 is a thrust bearing 42*a*. A spherical slider member 44 is axially slidably disposed on the drive shaft 26. The slider member 44 is formed with a spherical outer surface as shown. The swash plate 34 is pivotally disposed on the spherical outer surface of the slider member 44. For this pivotal connection, the swash plate 34 is formed with a concave bore with which the spherical outer surface of the slider member 44 is slidably engaged. The swash plate 34 and the rotor member 42 are formed with respective links 46 and 48. A pin 50 extending from the link 46 of the swash plate 34 extends into an elongate slot 52 formed in the link 48 of the rotor member 42, so that the swash plate 34 and the rotor member 42 are hinged to each other. A pair of aligned pins 44*a* are arranged between the swash plate 34 and the slider member 44 to effect the pivotal movement of the swash plate 34 about the common axis of the aligned pins.

Designated by numerals 26*a* and 26*b* are springs which are disposed about the drive shaft 26 to bias the slider member 44 in opposed directions. Designated by numerals 26*c* and 26*d* are radial and thrust bearings for bearing a right end portion of the drive shaft 26. Thus, when, due to rotation of the drive shaft 26, the rotor member 42 is rotated, the swash plate 34 is also rotated about the axis of the drive shaft 26. With movement of the slider member 44 along the drive shaft 26, the swash plate 34 is subjected inclination relative to the drive shaft 26 using the pin 50 as a fulcrum. That is, the inclination angle of the swash plate 34 relative to an imaginary plane perpendicular to the axis of the drive shaft 26 is adjustable. When, as is seen from FIG. 10, the balancer 34*a* of the swash plate 34 is in contact with the rotor member 42, the inclination angle takes its maximum value.

The first head 14 has a known control valve "Cv" installed therein. Due to work of this control valve "Cv", the amount of refrigerant discharged from the compressor 10C can be adjusted, and the inlet pressure of the compressor 10C can be kept constant.

Inlet and outlet ports 54 and 56 are formed in the first head 14, as shown. The inlet port 54 receives a return refrigerant from an evaporator (not shown). The refrigerant is then introduced into the cylinder chambers 18 in order through an intake opening 54*a* and the intake valves (not shown) of the valve sheet 22 in response to the intake stroke of the corresponding pistons 232. After being compressed by the pistons 232, the refrigerant in the cylinder chambers 18 is led into the outlet port 56 in order through the discharge valves (not shown) of the valve sheet 22.

In the compressor 10C of this third embodiment, the following measure is employed, which will be described with reference to FIGS. 12 to 14.

Figure 11:
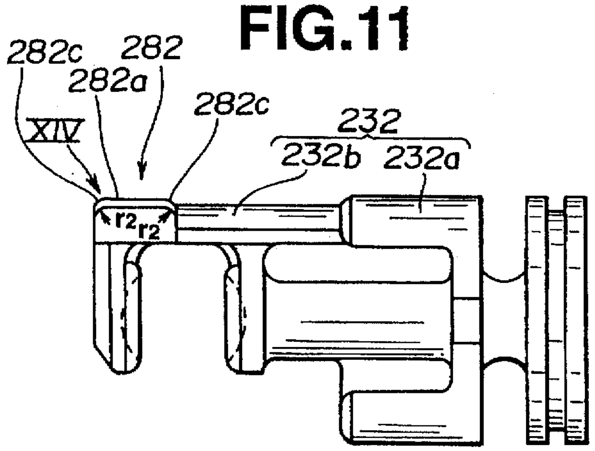
FIG. 11 is a side view of a piston employed in the third embodiment.
Figure 12:
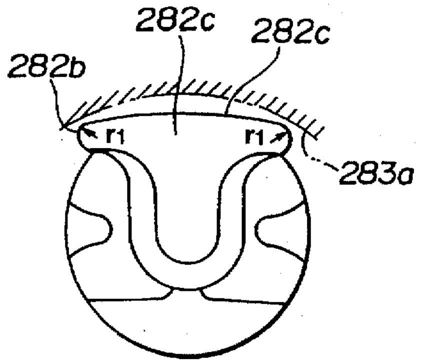
FIG. 12 is a rear view of the piston of the third embodiment.

As is seen from FIGS. 11 and 12, like in the above-mentioned first and second embodiments 10A and 10B., the generally U-shaped base portion 232*b* of the piston 232 is formed at its axially rear end with a so-called turn stopper portion 282.

The turn stopper portion 282 comprises a major part 282*a* with a slightly rounded outer surface which faces radially outward.

Figure 13:
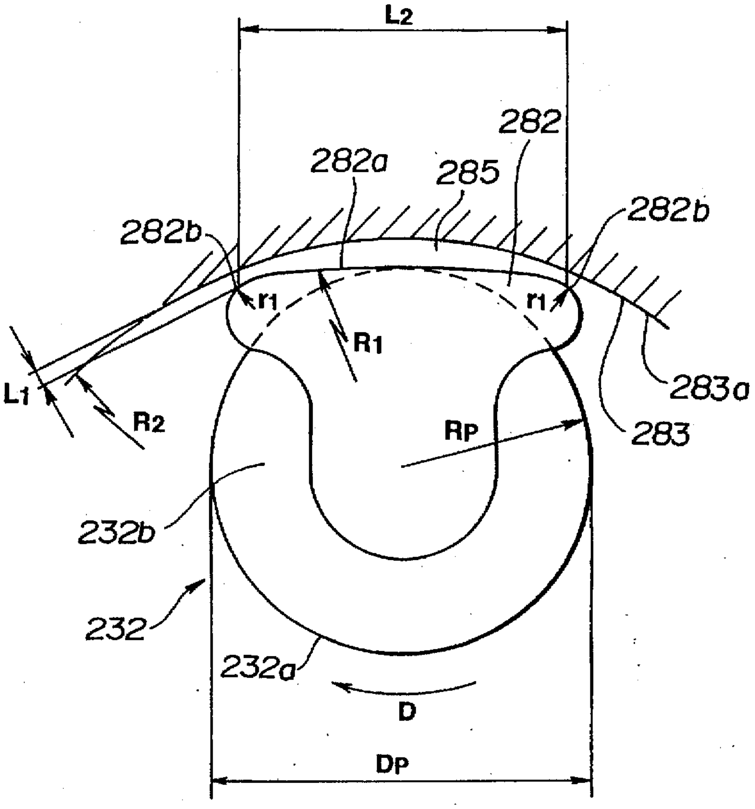
FIG. 13 is an enlarged view of FIG. 12, but showing the manner for suppressing a turning movement of the piston.
Figure 14:
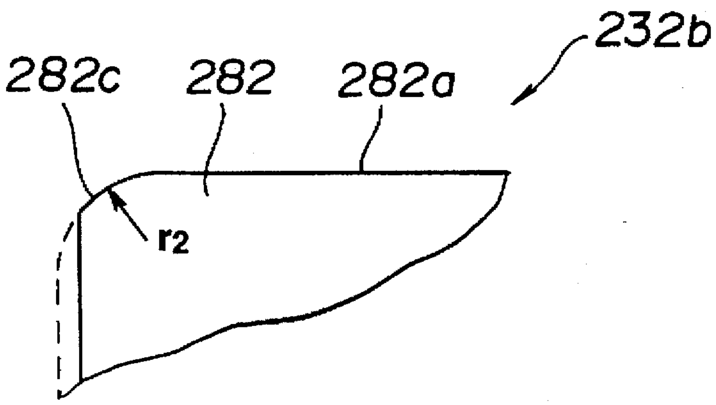
FIG. 14 is an enlarged view of a part of the piston, which is indicated by the arrow "XIV" in FIG. 11.

In the third embodiment 10C, laterally opposed sides 282*b* of the major part 282*a* are smoothly rounded with a radius of curvature of "$r_1$" as is seen from FIGS. 12 and 13, and, axially opposed sides 282*c* of the major part 282*a* are smoothly rounded with a radius of curvature of "$r_2$", as is seen from FIGS. 11 and 14. Preferably, the value "$r_1$" and "$r_2$" is each equal to or greater than 1 mm.

As is seen from FIG. 13, an inner cylindrical surface of the casing 12 is formed, at a portion facing the turn stopper portion 282 of the piston 232, with a concave recess 283 having a cylindrical surface 283*a*. As is understood from the drawing, upon assembly of the piston 232, a small given clearance "L1" is defined between each rounded shoulder part 282*b* of the turn stopper portion 282 of the piston 232 and the cylindrical surface 283*a* of the casing 12.

Accordingly, when, under operation of the compressor 10C, the piston 232 is turned about its axis in the direction of the arrow "D", the rounded left shoulder part 282*b* of the turn stopper portion 282 stops or minimizes the turning of the piston 232 by abutting against the cylindrical surface 283*a* of the concave recess 283 of the casing 12. Due to the nature of the rounded surfaces respectively possessed by the rounded left shoulder part 282*b* and the cylindrical surface 283*a*, a so-called "surface-to-surface contact is established therebetween upon such abutting. This advantageous function is substantially the same as that of the above-mentioned first embodiment 10A.

Due to provision of the rounded surfaces of the axially opposed sides 282*c* of the major part 282*a* of the turn stopper portion 282 of the piston 232, the third embodiment 10C has further the following advantageous function.

That is, when, under operation of the compressor 10C, the piston 232 is subjected to pitching, that is, play in the direction perpendicular to the cylindrical surface 283*a* of the casing 12, the rear (or left) rounded side 282c (see FIG. 11) of the turn stopper portion 282 abuts against the cylindrical surface 283a to stop or minimize the pitching. In this case, a so-called "surface-to-surface contact" is established between them, which minimizes noises produced.

In the following, the measure of the third embodiment 10C will be described in more detail with reference to FIG. 13.

In the drawing, designated by reference "$L_2$" is a distance between the left and right rounded shoulder parts 282b and 282b of the turn stopper portion 282. Preferably, the distance "$L_2$" is equal to or greater than 0.9 times the diameter "Dp" of the piston head portion 232a. Reference "$R_1$" designates a radius of curvature of the slightly rounded major part 282a of the turn stopper portion 282. The value "$R_1$" is greater than a radius "$R_p$" of curvature of the piston head portion 232a of the piston 232. Reference "$R_2$" designates a radius of curvature of the cylindrical surface 283a of the casing 12, which is greater than "$R_p$" but smaller than "$R_1$". The cylindrical surface 283a is a part of an imaginary cylinder whose center axis extends in parallel with the axis of the drive shaft 26. However, if desired, the cylindrical surface 283a may be a part of an imaginary cylinder whose center axis is common to the axis of the drive shaft 26. Thus, in this case, the cylindrical surfaces 283a for the turn stopper portions 282 of all the pistons 232 constitute a common cylinder surface whose center axis is common to the axis of the drive shaft 26.

With the above-mentioned dimensional features, there is defined a crescent space 285 between the major part 282a and the cylindrical surface 283a, which serves as an oil sump as has been mentioned hereinabove.

In the following, advantages of the third embodiment 10B will be described.

Due to the nature of the rounded surfaces possessed by the laterally opposed sides 282b and 282b and the axially opposed sides 282c and 282c of the turn stopper portion 282, not only the pivoting movement but also pitching movement of the piston 232 can be smoothly stopped without generating a marked noise.

Even under abutting of the turn stopper portion 282 of the piston 232 against the cylindrical surface 283a of the casing 12, the rounded left shoulder part 282b leaves a wedge-shaped oil catching pocket like in the case of the first embodiment 10A. Thus, the lubricant oil splashed by the swash plate 34 in the crank chamber 20 can penetrate easily between the turn stopper portion 282 and the cylindrical surface 283a from the pocket. In this case, the crescent space 285 defined between the turn stopper portion 282 and the cylindrical surface 283a serves as an oil sump.

Figure 15:
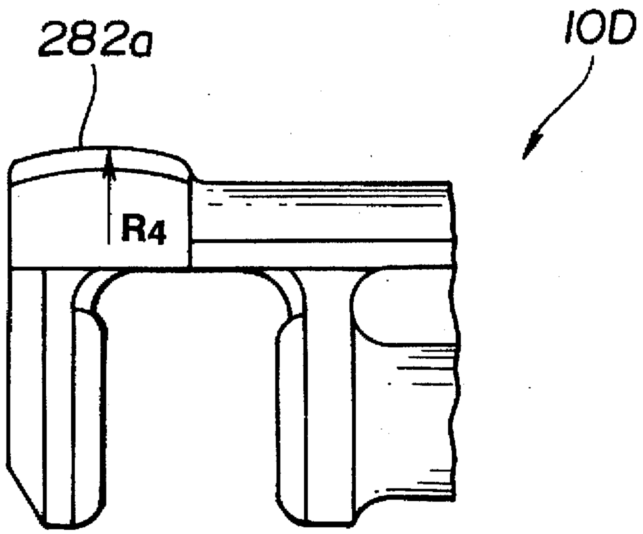
FIG. 15 is a side view of a rear base portion of a piston which is used in a fourth embodiment of the present invention.
Figure 16:
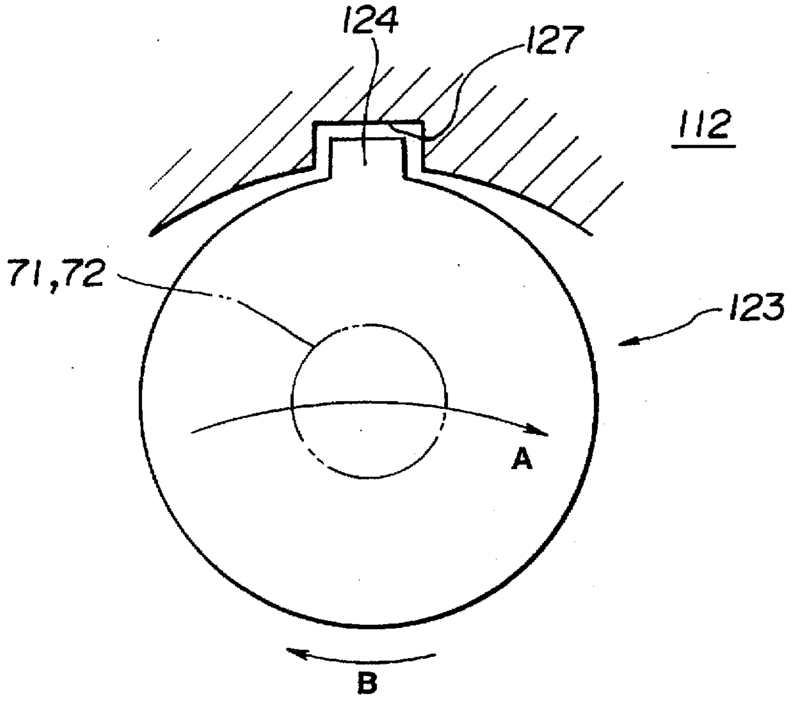
FIG.16 (PRIOR ART)
FIG. 16 is a view similar to FIG. 3, but showing a piston employed in a first conventional variable displacement swash plate type compressor.
Figure 17:
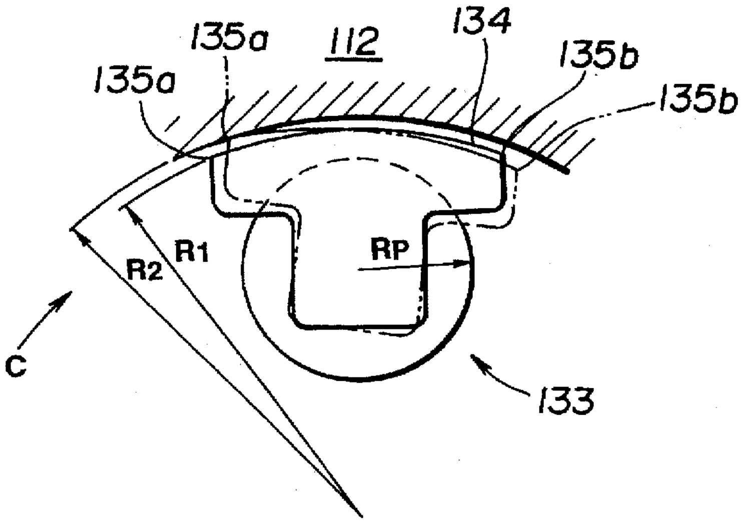
FIG.17 (PRIOR ART)
FIG. 17 is a view similar to FIG. 3, but showing a piston employed in a second conventional compressor.
Figure 18:
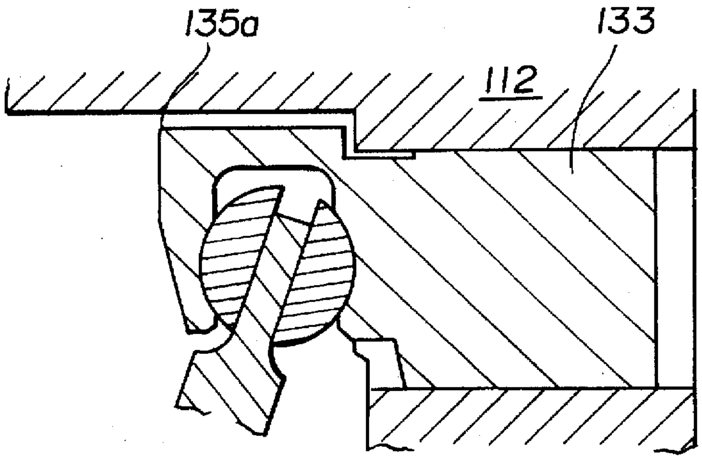
FIG.18 (PRIOR ART)
FIGS. 18, 19 and 20 are sectional views of a part of a conventional compressor, showing undesired pitching motion of a piston employed therein.
Figure 19:
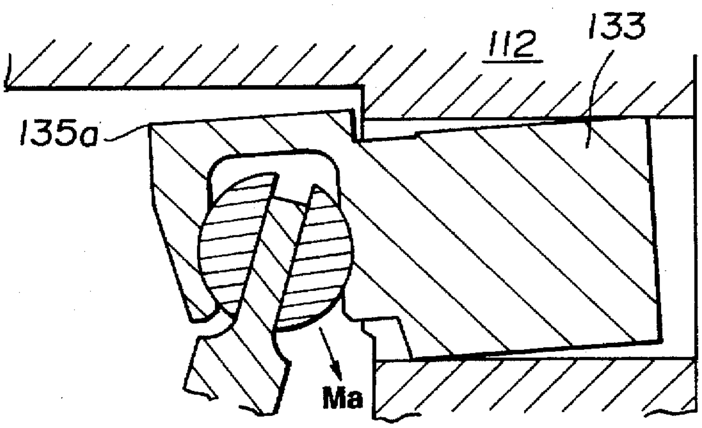
FIG.19 (PRIOR ART)
Figure 20:
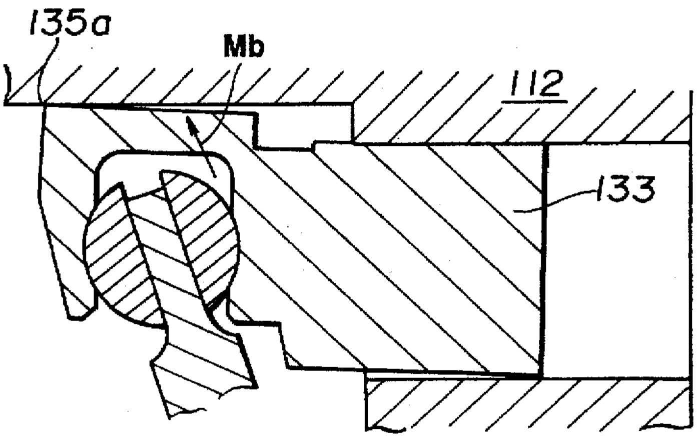
FIG.20 (PRIOR ART)

Referring to FIG. 15, there is shown a fourth embodiment 10D of the present invention, which is a modification of the above-mentioned third embodiment 10C.

In this fourth embodiment 10D, the major part 282a of the turn stopper portion 282 has a markedly rounded outer surface which has a radius of curvature of "$R_4$". Thus, upon abutting of the major part 282a with the cylindrical surface 283a of the casing 12, at least one part of the rounded outer surface makes a so-called "surface-to-surface contact" with the cylindrical surface 283a.

What is claimed is:

1. A variable displacement swash plate type compressor comprising:

a casing having a plurality of cylinder chambers circumferentially arranged therein;

a plurality of pistons incorporated with said cylinder chambers respectively;

a drive shaft extending in said casing;

a swash plate disposed on said drive shaft and inclinable relative to the same;

means for causing said swash plate to make spiral turns when said drive shaft is rotated;

means for achieving a hinged connection between the swash plate and each of the pistons so that when the drive shaft is rotated, each piston reciprocates in a corresponding cylinder chamber; and a structure for minimizing a turning movement of each piston about its axis, said structure including a turn stopper portion formed on a part of said piston which is constantly out of the corresponding cylinder chamber, said turn stopper portion including laterally opposed shoulder-shaped sides each having a rounded outer surface therethroughout; and means defining a cylindrical surface in said casing at a portion which faces said turn stopper portion, said cylindrical surface being so arranged as to make a surface-to-surface contact with one of said laterally opposed shoulder-shaped sides when said piston is turned about its axis by a given angle.

2. A variable displacement swash plate type compressor as claimed in claim 1, in which said turn stopper portion further includes a major part which is arranged between said laterally opposed sides, said major part being so constructed as to define a crescent space between said major part and said cylindrical surface.

3. A variable displacement swash plate type compressor as claimed in claim 2, in which said major part has a rounded outer surface which faces radially outward.

4. A variable displacement swash plate type compressor as claimed in claim 3, in which a radius of curvature of said rounded outer surface of said major part is greater than that of said cylindrical surface of said casing.

5. A variable displacement swash plate type compressor as claimed in claim 4, in which the radius of curvature of said cylindrical surface of said casing is greater than that of a piston head portion of said piston, said piston head portion being slidably received in the corresponding cylinder chamber.

6. A variable displacement swash plate type compressor as claimed in claim 5, in which the distance between said laterally opposed sides is equal to or greater than 0.9 times the diameter of a piston head portion of said piston.

7. A variable displacement swash plate type compressor as claimed in claim 2, in which said major part has a substantially flat outer surface which faces radially outward.

8. A variable displacement swash plate type compressor as claimed in claim 1, in which said cylindrical surface of said casing is constructed to be concentric with an axis of said drive shaft.

9. A variable displacement swash plate type compressor as claimed in claim 1, in which said cylindrical surface of said casing comprises:

two parallel bank portions which extend axially, each bank portion having a cylindrical top surface against which one of said laterally opposed sides of said turn stopper portion is brought into contact when said piston is subjected to the turning movement about its axis; and means for defining between said two parallel bank portions an axially extending groove.

10. A variable displacement swash plate type compressor as claimed in claim 9, in which said cylindrical top surface of each bank portion is concentric with an axis of said drive shaft.

11. A variable displacement swash plate type compressor as claimed in claim 3, in which said turn stopper portion further includes axially opposed sides each having a rounded outer surface, one of said axially opposed sides effecting a surface-to-surface contact with said cylindrical surface when said piston is subjected to a pitching motion.

12. A variable displacement swash plate type compressor as claimed in claim 11, in which said major part has a convex outer surface.

13. A variable displacement swash plate type compressor comprising:

a casing having a plurality of cylinder chambers circumferentially arranged therein;

a plurality of pistons incorporated with said cylinder chambers respectively;

a drive shaft extending in said casing;

a swash plate disposed on said drive shaft and inclinable relative to the same;

means for causing said swash plate to make spiral turns when said drive shaft is rotated;

means for achieving a hinged connection between the swash plate and each of the pistons so that when the drive shaft is rotated, each piston reciprocates in a corresponding cylinder chamber; and a structure for minimizing a turning movement of each piston about its axis, said structure including a turn stopper portion formed on a part of said piston which is constantly out of the corresponding cylinder chamber, said turn stopper portion including a major part which has a rounded outer surface and laterally opposed rounded edges; and means defining a cylindrical surface in said casing at a portion which faces said turn stopper portion, said cylindrical surface being so arranged as to make a surface-to-surface contact with one of said laterally opposed edges when said piston is turned about its axis by a given angle.

14. A variable displacement swash plate type compressor comprising:

a casing having a plurality of cylinder chambers circumferentially arranged therein;

a plurality of pistons incorporated with said cylinder chambers respectively;

a drive shaft extending in said casing;

a swash plate disposed on said drive shaft and inclinable relative to the same;

means for causing said swash plate to make spiral turns when said drive shaft is rotated;

means for achieving a hinged connection between the swash plate and each of the pistons to make a reciprocative movement of each piston when the drive shaft is rotated; and a structure for minimizing a turning movement of each piston about its axis, said structure including:

a given part of the piston which is always out of the corresponding cylinder chamber;

a turn stopper portion formed on said given part, said turn stopper portion including a major part which has a rounded outer surface; and a cylindrical surface defined by an inner wall of said casing at a position which faces said turn stopper portion, said cylindrical surface including two parallel bank portions which extend axially and have each a cylindrical top surface, and means which defines an axially extending groove between said two parallel bank portions, the cylindrical top surface of each bank portion being so arranged as to make a surface-to-surface contact with the rounded outer surface of the major part of said turn stopper portion when said piston is burned about its axis by a given angle.

15. A variable displacement swash plate type compressor comprising:

a casing having a plurality of cylinder chambers circumferentially arranged therein;

a plurality of pistons incorporated with said cylinder chambers respectively;

a drive shaft extending in said casing;

a swash plate disposed on said drive shaft and inclinable relative to the same;

means for causing said swash plate to make spiral turns when said drive shaft is rotated;

means for achieving a hinged connection between the swash plate and each of the pistons to make a reciprocative movement of each piston when the drive shaft is rotated; and a structure for minimizing a turning movement of each piston about its axis, said structure including:

a given part of the piston which is always out of the corresponding cylinder chamber;

a turn stopper portion formed on said given part, said turn stopper portion including a major part which has a rounded outer surface, laterally opposed rounded sides and axially opposed rounded sides; and means defining a cylindrical surface in said casing at a portion which faces said turn stopper portion, said cylindrical surface being so arranged as to make a surface-to-surface contact with one of said laterally opposed rounded sides when said piston is turned about its axis by a given angle and so arranged as to make a surface-to-surface contact with one of said axially opposed rounded sides when said piston is subjected to a pitching motion.

16. A variable displacement swash plate type compressor comprising:

a casing having a plurality of cylinder chambers circumferentially arranged therein and an inner cylindrical surface adjacent to said cylinder chambers;

a drive shaft;

a variable-tilt swash plate rotated by said drive shaft; and a plurality of pistons, each piston having a head portion that is slidably received in one of said cylinder chambers and reciprocates within a corresponding cylinder chamber in response to a rotation of said swash plate and a turn stopper portion that does not enter the corresponding cylinder chamber, the turn stopper portion including an outer surface opposing the inner cylindrical surface of said casing and laterally opposed rounded corners, one of said laterally opposed corners making a surface-to-surface contact with the inner cylindrical surface of said casing when said piston is turned about a center axis of said piston.

17. A variable displacement swash plate type compressor as claimed in claim 16, wherein a crescent space is defined between the rounded outer surface of the turn stopper portion and the inner cylindrical surface of said casing.

18. A variable displacement swash plate type compressor as claimed in claim 16, wherein the outer surface of the turn stopper portion is rounded.

19. A variable displacement swash plate type compressor as claimed in claim 16, wherein the laterally opposed rounded corners of the turn stopper portion extends axially toward the piston head portion.

20. A variable displacement swash plate type compressor as claimed in claim 19, wherein the radii of curvature of the laterally opposed rounded corners are smaller than the radius of curvature of the piston head portion.

* * * * *